(12) United States Patent
Eckhardt et al.

(10) Patent No.: US 7,276,545 B2
(45) Date of Patent: Oct. 2, 2007

(54) N-ALKYLAZIRIDINE PREPOLYMERS AS A DENTAL MATERIAL

(75) Inventors: Gunther Eckhardt, Bad Duerrenberg (DE); Guenther Lechner, Woerthsee (DE); Erich Wanek, Kaufering (DE)

(73) Assignee: 3M ESPE AG, Seefeld (DE)

( * ) Notice: Subject to any disclaimer, the term of this patent is extended or adjusted under 35 U.S.C. 154(b) by 501 days.

(21) Appl. No.: 10/478,807

(22) PCT Filed: May 29, 2002

(86) PCT No.: PCT/EP02/05916

§ 371 (c)(1),
(2), (4) Date: Nov. 26, 2003

(87) PCT Pub. No.: WO02/102877

PCT Pub. Date: Dec. 27, 2002

(65) Prior Publication Data

US 2004/0149164 A1    Aug. 5, 2004

(30) Foreign Application Priority Data

May 31, 2001   (DE)   ................. 101 26 476

(51) Int. Cl.
*A61K 6/10* (2006.01)
*A61C 13/00* (2006.01)
*C08F 283/00* (2006.01)

(52) U.S. Cl. ............ 523/109; 523/120; 433/199.1; 525/417

(58) Field of Classification Search ................ 523/109; 433/199.1
See application file for complete search history.

(56) References Cited

U.S. PATENT DOCUMENTS

| | | | |
|---|---|---|---|
| 3,453,242 A | 7/1969 | Schmitt et al. | |
| 4,167,618 A | 9/1979 | Schmitt et al. | |
| 4,353,242 A | 10/1982 | Harris et al. | |
| 4,493,911 A | 1/1985 | Schmitt et al. | |
| 4,532,268 A | 7/1985 | Jochum et al. | |
| 5,130,348 A | 7/1992 | Zahler et al. | |
| 5,569,691 A | 10/1996 | Guggenberger et al. | |
| 5,700,875 A | 12/1997 | Zeng et al. | |
| 5,859,089 A | 1/1999 | Qian | |
| 6,127,449 A | 10/2000 | Bissinger et al. | |
| 6,127,451 A | 10/2000 | Qian | |
| 6,383,279 B1 | 5/2002 | Eckhardt et al. | |
| 6,395,801 B1 | 5/2002 | Bissinger et al. | |
| 6,894,144 B1 | 5/2005 | Zech et al. | |
| 7,175,430 B1 | 2/2007 | Gasser et al. | |
| 2003/0153726 A1 | 8/2003 | Eckhardt et al. | |
| 2006/0106127 A1* | 5/2006 | Klettke et al. ............. | 523/113 |

FOREIGN PATENT DOCUMENTS

| | | |
|---|---|---|
| DE | 915 325 | 7/1954 |
| DE | 1 745 810 | 1/1970 |
| DE | 27 15 818 A | 10/1977 |
| DE | 32 45 052 A1 | 6/1984 |
| DE | 32 46 654 A1 | 6/1984 |
| DE | 37 28 216 A1 | 3/1988 |
| DE | 37 28 216 C2 | 5/1993 |
| DE | 43 06 997 A1 | 9/1994 |
| DE | 197 11 514 A1 | 9/1998 |
| DE | 197 40 234 A1 | 3/1999 |
| DE | 69511822 T2 | 5/2000 |
| DE | 19882513 T | 7/2000 |
| DE | 199 42 459 A1 | 3/2001 |
| DE | 69518037 T2 | 3/2001 |
| DE | 100 18 918 C2 | 11/2001 |
| EP | 0 110 429 A2 | 6/1984 |
| EP | 0 110 429 B1 | 1/1990 |
| EP | 0 421 371 A2 | 4/1991 |
| EP | 0 421 371 A3 | 4/1991 |
| EP | 0 421 371 B1 | 8/1994 |
| EP | 0 613 926 A2 | 9/1994 |
| EP | 0 613 926 A3 | 9/1994 |
| EP | 0 613 926 B1 | 9/1994 |
| EP | 0269071 B1 | 10/1995 |
| EP | 0 684 033 A1 | 11/1995 |
| EP | 0 712 622 A1 | 5/1996 |
| EP | 0 865 784 A2 | 9/1998 |
| EP | 0 865 784 A3 | 9/1998 |
| EP | 0 901 785 A2 | 3/1999 |
| EP | 0 901 785 A3 | 3/1999 |
| EP | 0 712 622 B1 | 9/1999 |
| EP | 0 684 033 B1 | 7/2000 |
| JP | 37-017392 B | 10/1962 |
| JP | 03-120205 A | 5/1991 |
| JP | 11-139921 A | 5/1999 |
| JP | 2003-507350 T | 2/2006 |
| WO | WO99/01104 A2 | 1/1999 |
| WO | WO 01/79328 A1 | 10/2001 |

OTHER PUBLICATIONS

DIN 50125 "ICS 77.040.10 Prüfung metallischer Werkstoffe—Zugproben," (in German) (English translation: ICS 77.040.10 Testing of metallic materials—Tensile test pieces), 11 pgs (English translation, 10 pgs) (Jan. 2004).

DIN 53505 "ICS 83.060 Härteprüfung nach Shore A und Shore D," (in German) (English translation: ICS 83.060 Testing of Rubber and Elastomers Shore A and Shore D Hardness Test), 5 pgs (English Translation, 8 pgs) (Aug. 2000).

(Continued)

*Primary Examiner*—Tae H Yoon
(74) *Attorney, Agent, or Firm*—Mueting, Raasch & Gebhardt, P.A.

(57) ABSTRACT

Mixtures of chain-extended N-alkylaziridino prepolymers are disclosed herein. The disclosed mixtures of chain-extended N-alkylaziridino prepolymers can be used in combination with additional materials to make curable formulations that can be used, for example, as dental materials such as impression compounds.

17 Claims, No Drawings

OTHER PUBLICATIONS

DGF-Einheitsmethoden Abteilung C—Fetter, C-V-11b (02) "Iodzahl nach Kaufman Cyclohexane/Eisessig-Methode," (in German) (English translation: Iodine number according to Kaufman Cyclohexane/acetic acid method) 8 pgs. (English translation, 7 pgs) (May 2002).

Houben-Weyl, *Methoden der Organischen Chemie*, "1,2-Alkylenimine A. Herstellung durch Ringschlußreation I. Äthylenimin," (English translation: Methods of Organic Chemistry, "1, 2-Alkyleneimines A. Synthesis by ring closure reaction I. Ethyleneimine,"), Verlag, Stuttgart, Title page and pp. 227-268 (English translation, 39 pgs) (1958).

O.C. Dermer and G.E. Ham (Eds.), *Ethylenimine and other Aziridines*, Academic Press, New York and London, Title Page, Publication Page, and Table of Contents (5 pgs total) (1969).

Houben-Weyl, *Methoden der Organischen Chemie*, [Houben-Weyl, Methods of Organic Chemistry], vol. 11/Part 2, Georg Thieme Verlag, Stuttgart, Title page, Publication page, and Table of Contents (5 pgs total) (Oct. 3, 1958).

Houben-Weyl, *Methoden der Organischen Chemie*, [Houben-Weyl, *Methods of Organic Chemistry*], vol. E5/Part 1, Gregg Thieme Verlag, Stuttgart, New York, Title page, Publication page, and Table of Contents, and p. 659 (9 pgs total) (May 30, 1985).

R.R. Jay, "Direct Titration of Epoxy Compounds and Aziridines," Anal. Chem. vol. 36, No. 6, Publication page, and pp. 667-668 (Mar. 1964).

Ullmans "Enzyklopaedie der technischen Chemie," [Ullman's Encyclopedia of Technical Chemistry], 4th Edition, vol. 11, Verlag Chemie, Weinheim/Bergstr., Title page, Table of Contents, and pp. 468-471, no date indicated.

\* cited by examiner

N-ALKYLAZIRIDINE PREPOLYMERS AS A DENTAL MATERIAL

The present application is a U.S. National Stage Application of PCT/EP02/05916, filed 29 May 2002. The application also claims the benefit under 35 U.S.C. Section 119 of foreign application No. DE 101 26476.3, filed 31 May 2001.

The invention relates to N-alkylaziridino prepolymers and their use in materials which cure by polymer-forming reactions.

In particular, the invention relates to those N-alkylaziridino prepolymers which, owing to chain extension, are distinguished by a broad molar mass distribution and which can be used in dentistry and in dental technology for impressions.

Elastic impression compounds based on N-alkylaziridino monomers have long been known. Thus, for example, DE-C-174 58 10 describes the production of moldings based on aziridinopolyethers.

In the publications DE-C-32 46 654, EP-A-0 421 371 and EP-A-0 110 429, the use of aziridinopolyethers in polyether impression compounds is described.

Impression compounds based on N-alkylaziridino-polyethers generally consist of a catalyst component and a base component which are stored separately and mixed before use.

In the dental application, the still flowable mixed formulation is generally introduced into the patient's mouth on an impression tray and pressed onto the row of teeth, and solidifies to give an elastic solid as a result of polymer-forming reactions of the N-alkylaziridinopolyethers used.

There is a wide range of requirements with regard to the processibility of the mixed formulation and the properties of the resulting elastic solid. These requirements differ greatly depending on the specific clinical situation and the impression techniques practised. This requires the development of a range of different impression compounds which are distinguished by very different combinations of the properties.

Important property requirements are the setting curve with a certain total processing time and the necessary residence time in the mouth and the mechanical properties of the solid elastomer, such as hardness, strength and elastic deformability.

Usually, an attempt is made to approach the desired combinations of properties through the choice of the compounds of the below-described components (A) to (E) of the mixed formulation and through the choice of the ratio of these compounds to one another.

In the case of the N-alkylaziridino monomers used to date, for example in DE-A-197 40 234, independent establishment of a setting curve, as desired, for example, in the case of fast-setting materials for the production of single crowns, and of the mechanical properties of the solid elastomer was possible only to a limited extent since faster setting, as can be achieved in the case of a higher density of aziridino groups, is associated with higher Shore hardness and reduced tensile strength and elongation at break.

In particular, it proved to be very difficult to produce solid elastomers which are distinguished by high elongations at break, in combination with a predetermined total processing time, tensile strength and hardness.

It is therefore an object of the present invention to provide novel N-alkylaziridino prepolymers on the basis of which it is possible to prepare curable formulations which, while maintaining total processing times of from 90 to 180 seconds after curing, have tensile strength values of more than 1.0 MPa, determined according to EN 24823, and a Shore A hardness of from 40 to 60, determined according to DIN 53505, and are distinguished by high elongations at break.

This object is achieved by N-alkylaziridino prepolymers which, in comparison with N-alkylaziridino prepolymers known from the prior art, have an extended chain and have the following general formula:

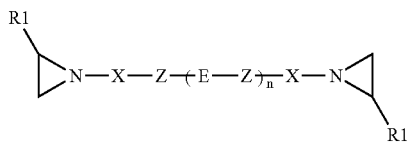

in which n is an integer from 1 to 50;

R1 is H or $C_1$- to $C_{12}$-alkyl;

X is a divalent, saturated or unsaturated, linear, branched, cyclic or polycyclic hydrocarbon radical which may contain from 0 to 5 hetero atoms from the group consisting of O, NR1 and S and comprises altogether from 1 to 50, preferably from 2 to 30 and particularly preferably from 2 to 20 C atoms, and this hydrocarbon radical contains a group selected from a group consisting of —NR1—(C=O)—O—, —NR1-(C=O)—NR1-, —(C=O)—O— and —(C=O)—S—, which represents the covalent link to the polymer radical Z;

Z is a divalent prepolymer radical having number average molar masses in the range from 1 500 to 45 000 g/mol, from the group consisting of polyesters, polycarbonates, polyolefins, polysiloxanes and polyethers;

E is —X'-A-X'—

A is a divalent saturated or unsaturated linear, branched, cyclic or polycyclic hydrocarbon radical which optionally also contains aromatics and may contain from 0 to 15 hetero atoms from the group consisting of O, NR1 and S and comprises altogether from 0 to 50, preferably from 1 to 30, particularly preferably from 1 to 20 C atoms;

X' is a divalent saturated or unsaturated, linear, branched, cyclic or polycyclic radical which optionally also contains aromatics and may contain from 0 to 15 hetero atoms from the group consisting of O, NR1 and S, and this radical contains a group selected from the group consisting of —NR1-(C=O)—O—, —NR1-(C=O)—NR1-, —(C=O)—O— and —(C=O)—S—, which represents the covalent link to the polymer radical Z.

Each choice of a radical mentioned more than once via indices or via repetition of the symbol in the context of this application is to be regarded as being independent of every other choice from the same group. For example, mention of the radical R1 twice in a molecule means that the position of R1 can be replaced both by methyl and by propyl in the same molecule.

Preferably, the prepolymer radical Z in the above formula has a polyether structure, this consisting, in a particularly preferred embodiment, of dimethyleneoxy and tetramethyleneoxy units and the molar ratio of these monomer units being from 1:2.5 to 1:5.

Z is preferably a divalent polymer radical having a number average molar mass in the range from 5 000 to 25 000, more preferably from 6 000 to 20 000 and particularly preferably in the range from 6 000 to 10 000 g/mol.

Preferably, the chain-extended N-alkylaziridino prepolymers are used not in pure form but as a mixture with non-chain-extended N-alkylaziridino polymers of the formula

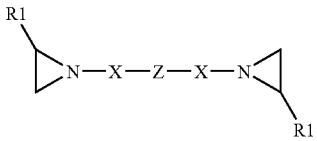

in which R1, X and Z have the abovementioned meaning.

In the case of these mixtures, the extension number (EN) is as a rule from 1.1 to 100, the extension number being defined as:

$$EN = \frac{\frac{\eta_e}{\eta_o}}{\frac{[Az]_e}{[Az]_o}}$$

where
η=inherent viscosity of the prepolymer, determined using a Haake viscometer at 23° C., stated in Pa·s
[Az]=concentration of the aziridino groups, determined by titration, stated in aziridino milliequivalents/kg
Index$_e$ designates the partially extended prepolymers
Index$_o$ designates the unextended prepolymers.

In a preferred embodiment, the urethane equivalent mass of the mixture is from 1 500 to 30 000 g/urethane group.

The titration for determining the aziridino group concentration is carried out in this application according to R. R. Jay, Anal. Chem. 36, 667 (1964).

The preparation of the mixtures of chain-extended and non-chain-extended N-alkylaziridino prepolymers is preferably effected by one of the following processes:

(i) a) Cationic copolymerization of ethylene oxide and tetrahydrofuran with the use of initiator alcohols having two OH groups,
b) conversion of the polyetherdiol obtained into polyether dichloroformates and
c) the reaction thereof with alkylenediamine and with iminoalkylenamine in the molar ratio of polyether dichloroformate alkylenediamine:iminoalkylenamine of from 1:0.01:2.05 to 1:0.95:0.15.

(ii) a) Cationic copolymerization of ethylene oxide and tetrahydrofuran with the use of initiator alcohols having two OH groups,
b) reaction of the polyetherdiol obtained with acrylic acid to give polyether diacrylate and
c) addition of alkylenediamine and, before or subsequently, of ethylenimine at the acrylate double bond in a molar ratio of acrylate group:alkylenediamine ethylenimine of from 1:0.01:1 to 1:0.30:0.45.

(iii) a) Cationic copolymerization of ethylene oxide and tetrahydrofuran with the use of initiator alcohols having two OH groups,
b) conversion of the polyetherdiol obtained into the polyetherdiol diimidazolide and
c) the reaction thereof with alkylenediamine and with iminoalkylene in the molar ratio of polyetherdiol diimidazolide alkylenediamine:iminoalkylenamine of from 1:0.01:2.05 to 1:0.95:0.15.

(iv) a) Cationic copolymerization of ethylene oxide and tetrahydrofuran with use of initiator alcohols having two OH groups,
b) partial chain extension of the polyetherdiol with diisocyanates in the molar ratio of from 1:0.99 to 1:0.01,
c) conversion of the remaining OH groups into N-alkylaziridino groups.

In the context of the present invention, the term "mixtures of chain-extended and non-chain-extended N-alkylaziridino prepolymers" is understood as meaning mixtures which consist exclusively of chain-extended and non-chain-extended N-alkylaziridino prepolymers. However, this term also covers mixtures which, in addition to these two components, contain, for example, one or more byproducts which may form, for example, in the preparation reactions described above.

In the present invention, the N-alkylaziridino prepolymers according to the invention are used in curable formulations which comprise:
(A) from 20 to 84.9% by weight, preferably from 30 to 59.6% by weight, of chain-extended N-alkylaziridino prepolymers or mixtures of chain-extended and non-chain-extended N-alkylaziridino prepolymers,
(B) from 5 to 40% by weight, preferably from 10 to 30% by weight, of compounds which soften the cured dental materials,
(C) from 10 to 40% by weight, preferably from 15 to 30% by weight, of fillers,
(D) from 0.1 to 10% by weight, preferably from 0.4 to 4% by weight, of initiators,
(E) from 0 to 10% by weight, preferably from 0 to 8% by weight, of further active substances, such as dyes, aromas, retardants, accelerators and surfactants.

Chain-extended N-alkylaziridino prepolymers whose number average molar mass has at least twice the value of non-chain-extended N-alkylaziridino prepolymers having a molar mass in the range from 1 500 to 45 000 g/mol are preferably used in these curable compositions.

The curable compositions are used as dental materials which are employed primarily for impression purposes.

The N-alkylaziridino prepolymers of component (A) and according to the invention comprise diaziridino compounds which, as a result of chain extension during the synthesis, have relatively long chain lengths between the two N-alkylaziridino groups in comparison with N-alkylaziridino prepolymers of the prior art:

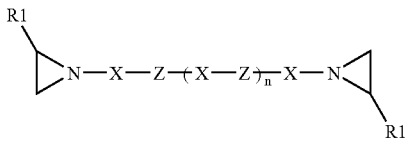

in which the variables and indices are to be understood as defined above.

In the invention, mixtures of chain-extended and non-chain-extended N-alkylaziridino prepolymers are preferably used.

Surprisingly, a higher setting rate is achievable with the use of the chain-extended prepolymers at the same concentration of aziridino groups in the mixed formulation in comparison with non-chain-extended prepolymers. At the same time, a substantially lower concentration of the aziridino groups in the mixed formulation is necessary for achieving the desired setting time. Curable formulations having improved cost-efficiency compared with the prior art can be prepared therewith.

The improved adjustability of the setting rate or of the setting curve according to the user's requirements by varying the degree of chain extension is furthermore advantageous. The mechanical properties of the solid elastomer are at a very good level.

The mass fraction of the non-chain-extended N-alkylaziridino prepolymers is preferably from 50 to 90% by weight, the number average molar mass of this fraction being in the range from 1 500 to 45 000, preferably from 5 000 to 25 000, more preferably from 6 000 to 20 000 and particularly preferably in the range from 6 000 to 10 000 g/mol.

The number average molar masses of the chain-extended N-alkylaziridino prepolymers can be several times and at least twice the value of the molar mass of the non-chain-extended fraction.

The urethane equivalent masses of the non-chain-extended and of the chain-extended fractions can be in the range from 2000 to 13000, preferably between 3000 and 10000 and particularly preferably between 3000 and 5000 g/urethane group.

Here, urethane equivalent mass is understood as meaning the mass in grams of the N-alkylaziridino prepolymer which contains 1.0 urethane group. This urethane equivalent mass can be calculated from the molar ratio and molar mass of the starting materials. The determination of the urethane equivalent mass is furthermore possible by means of spectroscopic methods.

For the preparation of the chain-extended N-alkylaziridino prepolymers, compounds which have at least two and up to ten, preferably exactly two, alcoholic OH groups are advantageously used as starting materials.

Usually, polyols, preferably polydiols, are used as starting materials, it being possible for the moieties between the terminal OH groups to belong to different classes of compounds: for example, polyesterpolyols, polyolefinpolyols, polycarbonatepolyols, polyetherpolyols, polysiloxanecarbinols and mixed structures of these classes of compounds are suitable. Polyetherpolyols, as obtainable by ionic homo- or copolymerization of cyclic compounds, such as ethylene oxide, propylene oxide, tetrahydrofuran, dioxane, cyclohexene oxide and glycidyl ethers, are preferred. Mixed polyethers based on ethylene oxide, propylene oxide and tetrahydrofuran in different ratios of these monomers are particularly preferred.

One preparation method for the precursors of the N-alkylaziridino prepolymers is the cationic polymerization of tetrahydrofuran, ethylene oxide and/or propylene oxide under the catalytic action of boron fluoride etherates and with the use of initiator alcohols which have at least two and up to ten, preferably exactly two, OH groups.

According to a subvariant of this preparation method, the polyetherpolyols prepared, in particular polyetherdiols, are extended with a diisocyanate, for example an alkylene diisocyanate, preferably 1,6-hexamethylene diisocyanate, and thus converted into N-alkylaziridino polyetherurethanes. The molar ratio of OH group to isocyanate group here should be from 1:0.99 to 1:0.01, preferably from 1:0.7 to 1:0.2 and particularly preferably from 1:0.55 to 1:0.35.

The reaction sequence described above is not limited to polyetherpolyols but can in principle be applied to polyols and in particular to polydiols whose moieties between the terminal OH groups belong to different classes of compounds, as described above.

According to a particularly preferred embodiment of the invention, copolyethers of ethylene oxide and tetrahydrofuran are used as starting materials for the preparation of the N-alkylaziridino prepolymers, the molar ratio of these monomers being from 1:2.5 to 1:5 and particularly preferably from 1:3 to 1:4.

Accordingly, the N-alkylaziridino prepolymers according to the invention contain tetramethyleneoxy units in the molecular skeleton in an amount of from 50 to 95, particularly preferably from 70 to 90, % by mass.

The preparation of the aziridino compounds from alcohols can be effected, for example, via chlorooxalates or chloroformates, and it may be advantageous to prepare activated amides, such as imidazolides, as intermediates. For example, aziridinoethanol and other hydroxyl- or amino-functional compounds are suitable as aziridino compounds to be subjected to an addition reaction, as described in Houben-Weyl, Vol. 11/2, page 272 et seq.

For achieving the partial chain extension according to the invention, it is possible, for example in the course of the preparation of the N-alkylaziridino prepolymers, to add diamines and iminoalkylenamines to the chloroformates at the stage of these intermediates.

According to another variant, the corresponding polydioldiimidazolides can be prepared from the polydiols by reaction with carbonyldiimidazolide, and diamines and iminoalkylenamines can be added to these intermediates too.

The two amine compounds can be used together or in succession in different sequences.

The molar ratio of polydiol dichloroformate or polydioldiimidazolide to diamine and to iminoalkylenamine may vary within wide limits and may be adjusted to values of from 1:0.01:2.05 to 1:0.95:0.15, preferably from 1:0.05:1.95 to 1:0.60:0.85 and particularly preferably from 1:0.10:1.90 to 1:0.45:1.20.

Suitable diamines are compounds having the following structure:

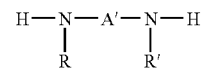

in which R=R' or R≠R'

R, R'=H or $C_1$- to $C_{12}$-alkyl

A'=a divalent organic radical, such as $C_2$- to $C_{30}$-alkylene, C6- to $C_{30}$-arylene, $C_7$- to $C_{30}$-alkarylene, aralkylene, $C_3$–$C_{30}$-cycloalkylene, it being possible in all of the abovementioned for from 1 to 10 $CH_2$ groups, where present, to be replaced by —O— or —NR—, —S—, —CO— or —COO—.

In principle, primary and secondary diamines or diamines having a primary and a secondary amino group may be used.

Primary aliphatic diamines, such as 1,2-ethylenediamine, 1,4-butylenediamine, 1,6-hexamethylenediamine, trimethylhexamethylenediamine, 4,9-dioxa-1,12-dodecanediamine or 4,7,10-trioxa-1,13-tridecanediamine, and secondary aliphatic diamines, such as, for example, piperazine are particularly preferably used.

Another route for the preparation of the N-alkylaziridino prepolymers according to the invention is the esterification of the alcoholic OH groups of the polyetherpolyols, obtained at the beginning of the synthesis chain, with an unsaturated carboxylic acid, such as acrylic acid or crotonic acid, and subsequent addition of diamine and ethylenimine at the double bond, analogously to the procedure for the preparation of aziridino monomers in example 13 of U.S. Pat. No. 3,453,242.

The addition reaction of the amines with the diacrylate can be carried out in different sequences, it being possible to establish a molar ratio of acrylate group:diamine:ethylenimine of from 1:0.01:1 to 1:0.30:0.45; preferably from 1:0.03:0.98 to 1:0.20:0.65 and particularly preferably from 1:0.05:0.95 to 1:0.15:0.75.

Independently of the chosen method of chain extension, the degree of chain extension achieved can be determined by the increase in polydispersity of the N-alkylaziridino prepolymers and comparison with the polydispersity of the unextended prepolymers. Here, the polydispersity (PD) is regarded as a quotient of the weight average molar mass ($M_w$) and the number average molar mass ($M_n$) according to $PD = M_w/M_n$.

For example, the number average molar mass can be determined by terminal group analysis of the prepolymers and the weight average molar mass by light scattering.

After calibration with defined fractions, calculation of numerical values of the polydispersity is also possible from the gel permeation chromatography data.

As a more readily obtainable characteristic of the degree of chain extension achieved and as an expression of the increase in the polydispersity, it is possible to use a dimensionless extension number (EN) which can be calculated according to the formula:

$$EN = \frac{\frac{\eta_e}{\eta_o}}{\frac{[Az]_e}{[Az]_o}}$$

from the characteristics of the prepolymers.

Here

η is the inherent viscosity of the prepolymer at 23° C., stated in Pa·s

[Az] is the concentration of the aziridino groups, determined by titration, stated in aziridino milliequivalents per kg [Az meq/kg]

Index$_e$ designates the extended prepolymers

Index$_o$ designates the unextended prepolymers.

In general, it was found that the achievable elongation at break of the cured elastomers increases with increasing extension number and there are therefore improved possibilities for establishing desired combinations of properties of the cured elastomer.

The partially chain-extended N-alkylaziridino prepolymers according to the invention are, for example, in the value range of the extension number EN of from 1.1 to 100, preferably from 2.0 to 30 and particularly preferably from 3.0 to 10.

The formulations according to the invention can, according to component (B), contain two classes of compounds which soften the cured dental materials, namely (B1) typical plasticizers having molar masses of less than 500 g/mol, (B2) polymers which are liquid at room temperature and have molar masses of more than 2 000 g/mol.

Different plasticizer types are used as compounds according to the fraction (B1), including typical plasticizers of the ester type, such as:

$C_{12}$- to $C_{15}$-alkyl lactates, ethyl or butyl esters of citric acid or of acetylcitric acid, phthalic esters of relatively long-chain branched alcohols, such as bis(2-ethylhexyl) phthalate or phthalic acid polyesters, $C_2$- to $C_{18}$-dialkyl esters of $C_2$- to $C_6$-dicarboxylic acids, such as bis(2-ethylhexyl) adipate, dioctyl maleate or diisopropyl adipate, aromatic and aliphatic sulfonic esters, such as $C_2$- to $C_{20}$-alkanesulfonic esters of phenol or of $C_1$- to $C_{18}$-alkanols and typical aromatic plasticizers, such as:

polyphenyls in a wide viscosity range, including waxy polyphenyls (from Monsanto), dibenzyltoluene, isomer mixtures of $C_{20}$- to $C_{30}$-aromatics, the use of mixtures of plasticizers of the ester type and of the aromatic type being preferred.

An example of a preferred mixture is acetyltributyl citrate and dibenzyltoluene.

The plasticizers of the type (B2) are compounds having molar masses of more than 2 000 g/mol and may belong to different types of compounds, such as the polyether type, polyester type, polycarbonate type or polyolefin type, preferred terminal groups being hydroxyl, ether, alkyl and acyl groups.

The choice of the terminal groups and any further functional groups is preferably made in such a way that no undesired reactions take place in the materials.

Particularly preferred terminal groups are the primary and the secondary OH group and the acetyl group.

A special class of compounds, liquid polymers, comprises those of the polyether type.

Polyethers which have a molar mass which is the same as or similar to that of the N-alkylaziridino polyethers used in component (A) are particularly distinguished here.

Bishydroxyl- or bisacetylpolyethers comprising oxytetramethylene and oxydimethylene units in the ratio 4:1 to 3:1 and having molar masses in the range from 3 000 to 8 000 g/mol and a content of oligomeric cyclic ethers of less than 0.5% by weight are particularly preferred.

It is also possible to use polypropylene oxide polyols and/or copolymers and/or block copolymers of ethylene oxide and propylene oxide having hydroxyl or acetyl terminal groups as a mixture with these special polyethers or as sole compounds according to component (B2).

In the case of the block copolymers having molar masses of greater than 2 000 g/mol, the solubilizing effect of these surfactant-like compounds can additionally be utilized.

Furthermore, the flow behavior and the necessary adjustment of hydrophilic and hydrophobic properties of the mixed formulations can be decisively influenced by the choice and the mixture of the abovementioned polyether derivatives.

The formulations according to the invention contain fillers as component (C).

For this purpose, it is possible to use organic and inorganic solids which cause no undesired reactions in the mixtures of the respective components during the necessary storage, and, after mixing of the separately stored components, do not adversely affect the course of setting.

Waxy substances and fats which are solid at room temperature and temperatures up to 40° C., such as trisacylglycerides, can be used as organic fillers. Trisacyl esters of glycerol of nonanimal origin in combination with inorganic solids are preferably used as component (C).

The trisacyl esters of glycerol may consist of modified fats of vegetable origin, for example of hydrogenated palm oil or soybean oil or of synthetic fats.

Suitable fats are described in DE-A-197 11 514, which is hereby fully incorporated by reference. Avocado oil, cotton seed oil, peanut oil, cocoa butter, pumpkin seed oil, linseed oil, corn oil, olive oil, palm oil, rice oil, colza oils, safflower oil, sesame oil, soybean oil, sunflower oil, grape-seed oil, wheatgerm oil, Borneo tallow, fulwa butter, hemp oil, illipé butter, lupin oils, chinawood oil, kapok oil, katiau oil, kenaf oil, kekuna oil, poppy oil, mowra butter, okra oil, perilla oil, sal butter, shea butter and tung oil are particularly suitable, provided that these fats have been hardened before their use. Hardened fats which are regarded as being suitable are those whose iodine number (measured according to standard DGF C-V 11b) is less than 20. Particularly preferred fats are those whose iodine number is less than 5. The procedure for the hardening of fats is described, for example, in "Ullmanns Enzyklopädie der technischen Chemie" [Ullmann's Encyclopedia of Technical Chemistry], 4th edition, Volume 11, page 469. Mixtures and interesterified mixtures of these naturally occurring fats, and synthesized fats, such as Softisan 154 or Dynasan 118 (from Hüls), can likewise be used. The preparation of such synthetic triacylglycerides is relatively simple for a person skilled in the art and can be effected, for example, from glycerol and the corresponding fatty acid methyl esters. Such esterification reactions are described, inter alia, in "Houben-Weyl, Methoden der Organischen Chemie" [Houben-Weyl, Methods of Organic Chemistry], Vol. E5/Part 1, page 659 et seq. Preferred triacylglycerides correspond to the formula:

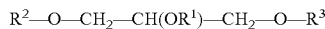

$R^2$—O—$CH_2$—CH($OR^1$)—$CH_2$—O—$R^3$ in which $R^1$, $R^2$ and $R^3$, independently of one another, are $C_{11}H_{23}CO$, $C_{13}H_{27}CO$, $C_{15}H_{31}CO$ or $C_{17}H_{35}CO$. Mixtures of such triacylglycerides are also suitable.

Solids having an $SiO_2$ content of more than 75% by weight, such as quartz powder and finely divided silicas of synthetic or natural origin, are suitable as inorganic fillers.

Pyrogenic silicas and precipitated silicas, which are generally used in surface-modified form, and diatomaceous earth from different deposits are preferred.

Mixtures of treated diatamaceous earth, whose 5% strength suspension has a pH of from 8 to 10, with synthetic fats having a steaoryl content of more than 65% by weight of the trisacylglyceride are particularly preferred.

Many of the known initiators can be used as initiators according to component (D). Those initiators or initiator systems which permit simple adjustment of the course of curing, have no adverse effects and make it possible to achieve the required level of the mechanical properties in a reproducible manner are expediently used.

DE-C-915 325 proposes the use of oxonium, ammonium and sulfonium salts as initiator substances.

A summary of the initiator substances used for curing N-alkylaziridino compounds is contained in O. C. DERMER, G. E. HAM, "Ethylenimine and other Aziridines", Academic Press (1969).

Accordingly, a large number of classes of compounds and a large number of compounds have proven to be polymerization initiators which are suitable in principle. However, in the practical use of cationic polymerization of aziridinopolyethers, it is very difficult to establish the desired course of setting with a sufficiently long processing time and rapid final curing. This object can be achieved by the use of special trisalkylsulfonium salts, as described, for example, in EP-A-0 110 429.

Patent Application DE-100 18 918 describes initiators which impart to the catalyst component only a low degree of acidity and which permit a readily adjustable, relatively long processing time after base component and catalyst component have been mixed.

Initiator systems of this type are suitable for curing the base pastes according to the invention at the necessary rate. By using them, the desired properties of the elastic solid can be achieved. They have proven particularly useful for the curing of N-alkylaziridinopolyethers according to the present invention and are advantageously used compared with other initiator systems.

Furthermore, the formulations according to the invention and according to component (E) may contain further active substances, such as dyes and colored pigments, aromas and flavor improvers, amine and alkaline retardants, accelerating compounds and further nonpolymeric surfactants.

In general, the formulations according to the invention contain from 0 to 10% by weight of component (E), preferably from 0 to 8% by weight, more preferably from 0.001 to 8% by weight, more preferably from 0.01 to 8% by weight and particularly preferably from 0.1 to 8% by weight.

Inter alia, preferred dyes and colored pigments are, for example, laked pigments; iron oxides, such as, for example, Sicovit® yellow iron oxide hydrate, are particularly preferred.

Inter alia, preferred aromas and flavor improvers are, for example, natural aromas; Karthauser, grapefruit and mint aromas are more preferred and, for example, spearmint aroma and peppermint oil are particularly preferred.

Inter alia, preferred amine or alkaline retardants are, for example, soluble imidazole compounds; 1-aryl- and 1-alkyl-substituted imidazoles, such as, for example, those mentioned in DE 32 45 052, are particularly preferred.

Inter alia, preferred nonpolymeric surfactants are, for example, nonionic surfactants; silicone polyether surfactants, block copolymers of EO/PO, alkylphenol derivatives, and fatty alcohol derivatives, such as, for example, those mentioned in DE 4306997, are particularly preferred.

The determination of the viscosity of the prepolymers according to the invention was carried out using a rotary viscometer from Haake with measuring element DIN SV according to the following provisos.

Establishment of the zero point after the rotary element has been fastened and before the filled measuring element is introduced into the measuring apparatus with the following switch positions by turning the potentiometer:

Damping: 1

Indicator selection switch T ( )

Signal amplification: 10%

Filling of the substance to be measured into the measuring element DIN SV in such a way that the rotary element is subsequently covered by about 1 mm.

Heating of the sample for about 20 min at 23.0° C.

Setting of the following measuring parameters, switching on of the apparatus and reading of the measured value in % after its stabilization:

| | |
|---|---|
| Constant A | 18.1 |
| Constant M | 6.45 |
| D | 9.0% |

Evaluation by means of the following formula:

$$\text{Viscosity[Pa·s]} = \frac{[\text{Constant } A] \cdot [\text{Measured value in \%}]}{[\text{Constant } M] \cdot [D \%]}$$

The invention is described in more detail below by examples, without there being any intention to limit it by said examples.

PREPARATIONS EXAMPLES FOR DENTAL MATERIALS

The catalyst components K1 and K2 described are prepared on a 100 g scale with the aid of laboratory kneaders. The preparation of the base components which are described in table 3 was effected on a 500 g scale.

Table 4 lists the mixtures which were investigated using the catalyst components described and the base components described in table 3, in the weight ratio stated in each case.

The mixtures according to table 4 were prepared by application to the mixing block by means of a trowel in the course of 30 seconds and used for determining the properties listed in table 5.

Preparation of the Catalyst Components

Catalyst Component K1

44 g of acetyltributyl citrate (component B1) were initially introduced into a laboratory kneader and 22 g of β-(S-stearyl-S-ethylsulfonium)butyronitrile fluoroborate (prepared according to U.S. Pat. No. 4,167,618, example 84) (component D) were dissolved. 10 g of diatomaceous earth and 24 g of pyrogenic silica (HDK H 2000, from Wacker) (component C) were incorporated into this mixture.

Catalyst Component K2 (According to DE-100 18 918)

61.1 g of a poly(ethylene oxide, propylene oxide)diol having a molar mass of 3000 g/mol (from Bayer AG, Acclaim 3201) (component B2) were initially introduced into a laboratory kneader, and 21 g of a hydrophobic precipitated silica (from Degussa, Sipernat D 17) (component C) were added stepwise.

9.9 g of p-toluenesulfonic acid monohydrate (component D) were dissolved in 5 g of distilled water and added to the pasty mixture. After homogenization, a paste consisting of 2 g of zinc oxide (component D) and 1 g of poly(ethylene oxide, propylene oxide)diol (from Bayer AG, Acclaim 3201) (component B2) having a molar mass of 3000 g/mol was added. The catalyst component was kneaded for a further hour after the final addition.

Preparation of the N-Alkylaziridino Prepolymers

Inventive Examples 1 to 4 and Comparative Example 1

A polyetherdiol having a number average molar mass of 6100 g/mol and a molar incorporation ratio of tetramethyleneoxy units to dimethyleneoxy units of 3.5:1 was prepared by cationic copolymerization of ethylene oxide and tetrahydrofuran under the catalytic action of boron fluoride etherate and with ethylene glycol as the initiator alcohol and was converted into the polyetherdioldiimidazolide with carbonyldiimidazole.

Hexamethylenediamine and iminopropylenamine were added to the polyetherdioldiimidazolide, and the mixture was stirred for 72 hours at 45° C., after which the reaction mixture was washed with water and dried in vacuo at 70° C.

Table 1 lists the molar ratios realized in the final synthesis stage and the characteristics of the extended N-alkylaziridinopolyethers.

In comparative example CE 1, the same batch of polyetherdioldiimidazolide was used as a starting material and no hexamethylenediamine was added in the final synthesis stage.

The characteristics of the unextended N-alkylaziridino prepolymer prepared according to comparative example CE 1 were included in the calculation of the extension number EN, as described above.

TABLE 1

Preparation and characterization of the N-alkylaziridino prepolymers according to the invention and of comparative example CE 1

| | Molar ratio | | | Viscosity [Pas] | Conc. of the aziridino groups [Az meq/kg] | EN[a] |
|---|---|---|---|---|---|---|
| | Polydiol diimidazolide | Hexamethylenediamine | Iminopropylenamine | | | |
| Inventive example 1 | 1.0 | 0.20 | 1.65 | 70.7 | 246 | 3.207 |
| Inventive example 2 | 1.0 | 0.30 | 1.47 | 116 | 223 | 5.804 |
| Inventive example 3 | 1.0 | 0.35 | 1.38 | 145 | 208 | 7.778 |
| Inventive example 4 | 1.0 | 0.40 | 1.26 | 180 | 193 | 9.952 |
| Comparative example CE 1 | 1.0 | none | 2.08 | 28.5 | 318 | 1.000 |

[a]The calculation of the extension number EN was carried out using the characteristics of the unextended N-alkylaziridino prepolymer according to comparative example CE 1.

Inventive Examples 5 and 6

Starting from the same batch of polyetherdiol as described in inventive examples 1 and 4, a chain extension was carried out with hexamethylene diisocyanate.

For this purpose, the polyetherdiol having a number average molar mass of 6 100 g/mol was mixed in the stated molar ratio with hexamethylene diisocyanate and the mixtures were stirred for 120 hours at 50° C.

The isocyanate had completely reacted under these conditions. The polyetherurethanediol extended in this manner was reacted with acrylic acid under the catalytic action of potassium carbonate to give the diacrylate, and ethylenimine was subjected to an addition reaction with a diacrylate analogously to the procedure described in U.S. Pat. No. 4,353,242, example 13.

The reaction mixture was washed with water and dried in vacuo.

Table 2 lists the molar ratios realized at the extension stage and the characteristics of the extended N-alkylaziridino prepolymers.

TABLE 2

| | Molar ratio | | Viscosity [Pas] | Conc. of the aziridino groups [Az meq/kg] | EN[a] |
|---|---|---|---|---|---|
| | Polyetherdiol | Hexamethylene diisocyanate | | | |
| Inventive example 5 | 1.0 | 0.25 | 42 | 237 | 1.977 |
| Inventive example 6 | 1.0 | 0.33 | 55 | 213 | 2.881 |

[a] The calculation of the extension number EN was carried out using the characteristics of the unextended N-alkylaziridino prepolymers according to comparative example CE 1.

TABLE 3

Composition of the base components in g/100 g

| | Component | Inventive example No. 7 | 8 | 9 | 10 | 11 | 12 | 13 | 14 | 15 | Comp. ex. CE 2 |
|---|---|---|---|---|---|---|---|---|---|---|---|
| A | N-alkyl-aziridino prepolymer acc. to inventive example # | | | | | | | | | | |
| | 1 | 67.0 | | | | | | | 10.3 | | |
| | 2 | | 66.1 | | | | | 20.3 | | | |
| | 3 | | | 65.7 | | | | | 49.1 | | |
| | 4 | | | | 65.5 | | | 40.1 | | 14.3 | |
| | 5 | | | | | 70.7 | | | | | |
| | 6 | | | | | | 60.6 | | | 41.7 | |
| | acc. to comp. ex. CE 1 | | | | | | | | | | 59.6 |
| B1 | Dibenzyltoluene | 11.2 | 10.4 | 8.9 | 12.7 | 14.7 | 11.3 | 10.7 | 7.9 | 13.1 | 10.0 |
| C | Synthetic trisacylglyceride having a steaoryl content of 75% by wt. | 7.1 | 11 | 13 | 8.7 | 6.6 | 16.0 | 15.6 | 18.7 | 17.8 | 16.7 |
| | Diatomaceous earth (Celatom MW 25, from CHEMAG) | 14.7 | 12.0 | 11.7 | 13.1 | 8.0 | 12.7 | 13.3 | 14.0 | 13.1 | 13.7 |

TABLE 4

Mixing ratios of the formulations, inventive examples 16 to 27 and comparative example CE 3

| | Invention example No. 16 | 17 | 18 | 19 | 20 | 21 |
|---|---|---|---|---|---|---|
| Base component acc. to tab. 3 | 7 | 8 | 9 | 9 | 10 | 10 |
| Catalyst component | K1 | K1 | K2 | K1 | K1 | K2 |

TABLE 4-continued

Mixing ratios of the formulations, inventive examples 16 to 27 and comparative example CE 3

| | | | | | | | |
|---|---|---|---|---|---|---|---|
| Mixing ratio by weight: catalyst component to base component | 1:4.2 | 1:5.0 | 1:5.0 | 1:4.3 | 1:4.2 | 1:5.0 | |

| | Inventive example No. | | | | | | Comp. ex. |
|---|---|---|---|---|---|---|---|
| | 22 | 23 | 24 | 25 | 26 | 27 | CE 3 |
| Base component acc. to tab. 3 | 11 | 12 | 13 | 13 | 14 | 15 | CE 2 |
| Catalyst component | K1 | K2 | K2 | K1 | K1 | K2 | K2 |
| Mixing ratio by weight: catalyst component to base component | 1:5.0 | 1:4.9 | 1:5.0 | 1:4.1 | 1:4.0 | 1:4.7 | 1:4.9 |

TABLE 5

Processing behavior and achieved mechanical properties of the formulations according to table 4

| | Inventive example No. | | | | | | |
|---|---|---|---|---|---|---|---|
| Property | 16 | 17 | 18 | 19 | 20 | 21 | 22 |
| Total processing time (23° C.) [sec] acc. to EN 24823 | 105 | 115 | 155 | 120 | 125 | 175 | 110 |
| End of curing[b)] [sec] | 250 | 300 | 480 | 325 | 370 | 510 | 320 |
| Shore A hardness after 24 h acc. to DIN 53505 | 60 | 58 | 55 | 57 | 54 | 52 | 59 |
| Elongation at break [%] acc. to EN 24823 | 99 | 112 | 145 | 142 | 190 | 195 | 105 |
| Tensile strength [MPa] acc. to EN 24823 | 1.43 | 1.35 | 1.46 | 1.47 | 1.41 | 1.51 | 1.37 |

| | Inventive example No. | | | | | |
|---|---|---|---|---|---|---|
| Property | 23 | 24 | 25 | 26 | 27 | CE 3 |
| Total processing time (23° C.) [sec] acc. to EN 24823 | 160 | 155 | 120 | 115 | 165 | 160 |
| End of curing[b)] [sec] | 460 | 440 | 330 | 315 | 450 | 450 |
| Shore A hardness after 24 h acc. to DIN 53505 | 54 | 53 | 57 | 56 | 52 | 58 |
| Elongation at break [%] acc. to EN 24823 | 117 | 160 | 155 | 150 | 137 | 72 |
| Tensile strength [Mpa] acc. to EN 24823 | 1.27 | 1.54 | 1.49 | 1.52 | 1.41 | 1.17 |

[b)]The end of curing is defined as the time when an elastic solid which has no surface tack perceptible by touching is present.

It is evident from the results in table 5 that total processing times in the range of from 90 to 180 seconds, tensile strength values greater than 1.0 MPa and Shore A hardnesses of from 40 to 60 after 24 h are obtained with the use of the extended N-alkylaziridino prepolymers according to the invention.

The advantages of the elastomers which were prepared using the prepolymers according to the invention (inventive examples 16 to 27) are very clearly evident from the characteristics of elongation at break, compared with the elastomer which was prepared using an unextended prepolymer (comparative example CE 3).

The invention relates to a mixture of elongated N-alkylaziridine prepolymers of general formula (I) wherein n represents a whole number between 1 and 50; R1 represents H or $C_1$ to $C_{12}$ alkyl; X represents a bivalent, saturated or unsaturated, linear, branched, cyclic or polycyclic hydrocarbon radical which can contain between 0 and 5 heteroatoms from the group O, NR1, S, which contains a total of between 1 and 50, preferably between 2 and 30, and ideally between 2 and 20 C atoms, and which comprises a group selected from —NR1—(C=O)—O—, —NR1—(C=O)—NR1—, —(C=O)—O—, —C(C=O)—S—, which represents that covalent link with the polymer radical Z; Z represents a bivalent prepolymer radical having number-average molar masses of between 1,500 and 45,000 g/mole, from the group comprising polyester, polycarbonate, polyolefins, polysiloxane and polyethers; E represents -X'-A-X'-; A represents a double radical, saturated or unsaturated, linear, branched, cyclic or polycyclic hydrocarbon radical which optionally contains aromatic compounds, can contain between 0 and 15 heteroatoms from group O, NR1, S, and comprises a total of between 0 and 50, preferably between 1 and 30, and ideally between 1 and 20 C atoms; and X' represents a double radical, saturated or un-saturated, linear, branched, cyclic or polycyclic radical which optionally contains aromatic compounds, can contain between 0 and 15 heteroatoms from the group O, NR1, S, and comprises a group selected from —NR1—(C=O)—O—, —NR1—(C=O)—NR1—, —(C=O)—O—, —(C=O)—S, which represents the covalent link with the polymer radical Z; with non-elongated N-alkylaziridine prepolymers of general formula (II) wherein R1, X and Z have the above-mentioned designations. The invention also relates to the production and the use of said mixture in hardenable compositions, especially in dental materials.

The invention claimed is:

1. A mixture of chain-extended N-alkylaziridino prepolymers of the following general formula

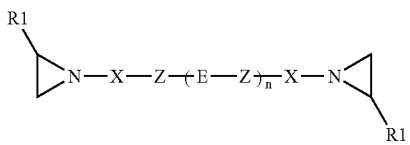

in which n is an integer from 1 to 50;

R1 is H or $C_1$- to $C_{12}$-alkyl;

X is a divalent, saturated or unsaturated, linear, branched, cyclic or polycyclic hydrocarbon radical which may contain from 0 to 5 hetero atoms from the group consisting of O, NR1 and S and comprises altogether from 1 to 50, C atoms, and this hydrocarbon radical contains a group selected from a group consisting of —NR1-(C=O)—O—, —NR1-(C=O)—NR1-, —(C=O)—O— and —(C=O)—S—, which represents the covalent link to the polymer radical Z;

Z is a divalent prepolymer radical having number average molar masses in the range from 1 500 to 45 000 g/mol, from the group consisting of polyesters, polycarbonates, polyolefins, polysiloxanes and polyethers;

E is —X'-A-X'—

A is a divalent saturated or unsaturated linear, branched, cyclic or polycyclic hydrocarbon radical which optionally also contains aromatics and may contain from 0 to 15 hetero atoms from the group consisting of O, NR1 and S and comprises altogether from 0 to 50 C atoms;

X' is a divalent saturated or unsaturated, linear, branched, cyclic or polycyclic radical which optionally also contains aromatics and may contain from 0 to 15 hetero atoms from the group consisting of O, NR1 and S, and this radical contains a group selected from the group consisting of —NR1-(C=O)—O—, —NR1-(C=O)—NR1-, —(C=O)—O— and —(C=O)—S—, which represents the covalent link to the polymer radical Z, with non-chain-extended N-alkylaziridino prepolymers of the general formula

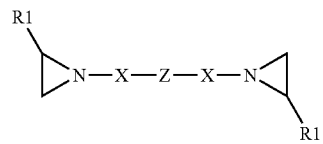

in which R1, X and Z have the above meaning.

2. The mixture as claimed in claim 1, characterized in that the prepolymer radical Z of the chain-extended N-alkylaziridino prepolymers has a polyether structure.

3. The mixture as claimed in claim 2, characterized in that the polyether structure consists of dimethyleneoxy and tetramethyleneoxy units and the molar ratio of these monomer units is from 1:2.5 to 1:5.

4. The mixture as claimed in any of claims 1 to 3, characterized in that the extension number (EN) of a mixture of chain-extended and non-chain-extended N-alkylaziridino prepolymers is from 1.1 to 100 and this extension number is defined as:

$$EN = \frac{\frac{\eta_e}{\eta_o}}{\frac{[Az]_e}{[Az]_o}}$$

where

θ=inherent viscosity of the prepolymer, determined using a Haake viscometer at 23° C., stated in Pa·s

[Az]=concentration of the aziridino groups, determined by titration, stated in aziridino milliequivalents/kg $Index_e$ designates the partially extended prepolymers $Index_o$ designates the unextended prepolymers.

5. The mixture of N-alkylaziridino prepolymers as claimed in claim 1, characterized in that the urethane equivalent mass of the mixture is from 2 000 to 13 000 g/urethane group.

6. A preparation of a mixture of N-alkylaziridino prepolymers as claimed in claim 1, comprising the steps:

a) cationic copolymerization of ethylene oxide and tetrahydrofuran with the use of initiator alcohols having two OH groups,
b) conversion of the polyetherdiol obtained into polyether dichloroformates and
c) the reaction thereof with alkylenediamine and with iminoalkylenamine in the molar ratio of polyether dichloroformate:alkylenediamine:iminoalkylenamine of from 1:0.01:2.05 to 1:0.95:0.15.

7. A preparation of a mixture of N-alkylaziridino prepolymers as claimed in claim 1 by a process comprising the steps:
a) cationic copolymerization of ethylene oxide and tetrahydrofuran with the use of initiator alcohols having two OH groups,
b) reaction of the polyetherdiol obtained with acrylic acid to give the polyether diacrylate and
c) addition of alkylenediamine and, before or subsequently, of ethylenimine at the acrylate double bond in a molar ratio of acrylate group:alkylenediamine:ethylenimine of from 1:0.01:1 to 1:0.30:0.45.

8. A preparation of a mixture of N-alkylaziridino prepolymers as claimed in claim 1 by a process comprising the steps:
a) cationic copolymerization of ethylene oxide and tetrahydrofuran with the use of initiator alcohols having two OH groups,
b) conversion of the polyetherdiol obtained into the polyetherdioldiimidazolide and
c) the reaction thereof with alkylenediamine and with iminoalkylenamine in the molar ratio of polyetherdioldiimidazolide:alkylenediamine:iminoalkylenamine of from 1:0.01:2.05 to 1:0.95:0.15.

9. A preparation of a mixture of N-alkylaziridino prepolymers as claimed in claim 1 by a process comprising the steps:

a) cationic copolymerization of ethylene oxide and tetrahydrofuran with the use of initiator alcohols having two OH groups,
b) partial chain extension of the polyetherdiol with diisocyanates in the molar ratio of from 1:0.99 to 1:0.01,
c) conversion of the remaining OH groups into N-alkylaziridino groups.

10. A curable formulation comprising:
(A) from 20 to 84.9% by weight of mixtures of chain-extended and non-chain-extended N-alkylaziridino prepolymers as claimed in claim 1,
(B) from 5 to 40% by weight of compounds which soften the cured dental materials,
(C) from 10 to 40% by weight of fillers, (D) from 0.1 to 10% by weight of initiators, (E) from 0 to 10% by weight of further active substances.

11. The curable formulation as claimed in claim 10, characterized in that chain-extended N-alkylaziridino prepolymers whose number average molar mass has at least twice the value of non-chain-extended N-alkylaziridino prepolymers having a molar mass in the range from 1 500 to 45 000 g/mol are used.

12. A method of providing a dental material using the curable formulation as claimed in claim 10.

13. The method of claim 12 wherein the dental material is an impression compound.

14. The mixture of claim 1 wherein X comprises altogether from 2 to 30 C atoms.

15. The mixture method of claim 1 wherein X comprises altogether from 2 to 20 C atoms.

16. The mixture of claim 1 wherein A comprises altogether from 1 to 30 C atoms.

17. The mixture of claim 1 wherein A comprises altogether from 1 to 20 C atoms.

* * * * *

UNITED STATES PATENT AND TRADEMARK OFFICE
CERTIFICATE OF CORRECTION

PATENT NO. : 7,276,545 B2
APPLICATION NO. : 10/478807
DATED : October 2, 2007
INVENTOR(S) : Eckhardt et al.

It is certified that error appears in the above-identified patent and that said Letters Patent is hereby corrected as shown below:

On The Title Page, Item 56, under Foreign Patent Documents, delete "JP 2003-507350 T 2/2006" and insert --JP 2003-507350 T 2/2003--;

In column 3, line 48, delete "dichloroformate alkylenediamine" and insert --dicholorformate:alkylenediamine--;

In column 3, lines 57-58, delete "alkylenediamine ethylenimine" and insert --alkylenediamine:ethylenimine--;

In column 3, lines 65-66, delete "diimidazolide alkylenediamine" and insert --diimidazolide:alkylenediamine--;

In column 18, line 42, claim 4, delete "in any of claims 1 to 3" and insert --as claimed in claim 1--;

In column 18, line 55, claim 4, delete " $\theta$" and insert --$\eta$--.

Signed and Sealed this

Twenty-fifth Day of March, 2008

JON W. DUDAS
*Director of the United States Patent and Trademark Office*